Mar. 6, 1923.

J. WHITTEMORE

METHOD AND APPARATUS FOR DRAWING SHEET GLASS

Filed Nov. 10, 1919

1,447,702

Inventor
James Whittemore

Attorneys

Patented Mar. 6, 1923.

1,447,702

UNITED STATES PATENT OFFICE.

JAMES WHITTEMORE, OF DETROIT, MICHIGAN, ASSIGNOR TO THE LIBBEY-OWENS SHEET GLASS COMPANY, OF TOLEDO, OHIO, A CORPORATION OF OHIO.

METHOD AND APPARATUS FOR DRAWING SHEET GLASS.

Application filed November 10, 1919. Serial No. 336,875.

*To all whom it may concern:*

Be it known that I, JAMES WHITTEMORE, a resident of the United States of America, residing at Detroit, in the county of Wayne and State of Michigan, have invented certain new and useful Improvements in Methods and Apparatus for Drawing Sheet Glass, of which the following is a specification, reference being had therein to the accompanying drawings.

The invention consists in a method and apparatus for drawing sheet glass, in which the glass is drawn from a tank or pool, and thence under a bending roll to the drawing mechanism; the glass being practically suspended from the drawing-point and the drawing mechanism, an intermediate bending roll, giving a uniform tension to the sheet and also acting largely to flatten it.

At the present time flat sheet glass is being drawn by the apparatus shown in Colburn Patent 1,248,809, in which the glass is drawn vertically from a tank or pool, bent over a bending roll to the horizontal position where the drawing mechanism is applied and the sheet is carried from the bending mechanism into the leer. In the use of this apparatus the principal difficulty has been the marring of the glass by the bending roll; and, while this has been overcome almost entirely, it requires that the glass shall be brought to just the right temperature and that the rolls shall be kept highly polished and also maintained at the proper temperature,—requiring care and attention at the drawing point to prevent this marring effect.

In the apparatus of the Colburn patent referred to, the glass is drawn against the bending roll by the entire drawing pull of the drawing mechanism, and the bending roll also sustains the entire weight of the glass which is below the roll; so that the pressure of the glass on the bending roll is very material. With my improved method and apparatus, the glass is pulled downwardly from the tank or pool to the drawing mechanism, so that the glass sheet is, in effect, sustained between the drawing point and the drawing mechanism,—while the bending roll does not carry any of the load of the sheet. The only pressure on the bending roll by the glass is the tension of the draft, and if the relationship between the drawing point and the drawing mechanism is as shown in this form of the apparatus, not only is the pressure contact of the glass greatly reduced but also the area contact is materially reduced, so that the marring effect of the bending roll is quite negligible.

Figure 1:
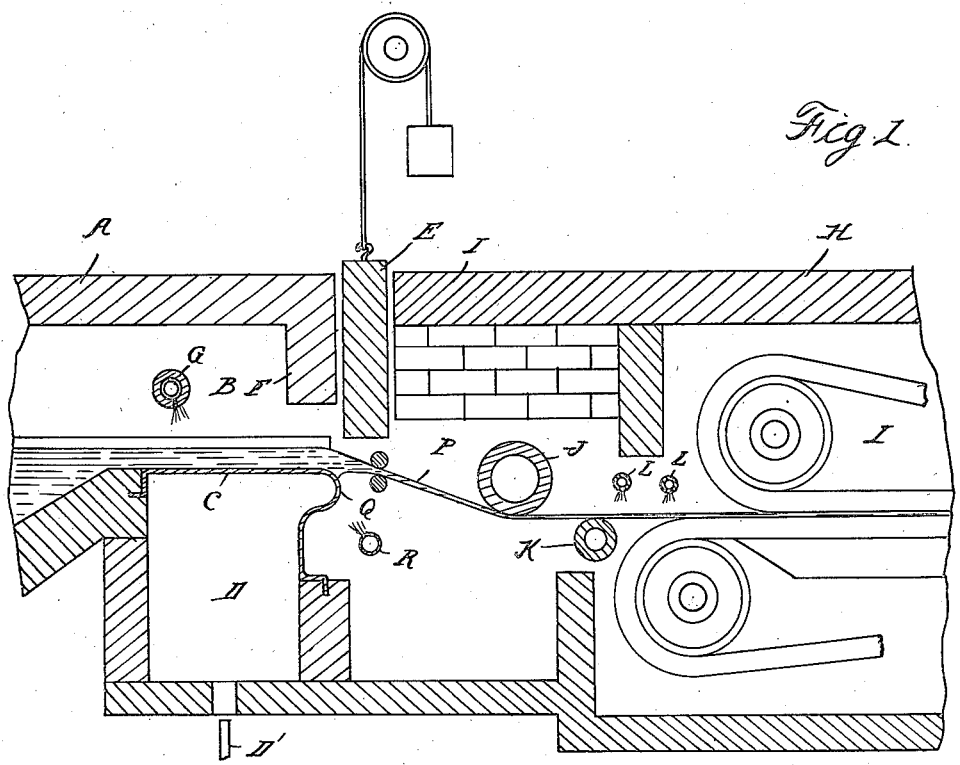
Figure 1 is a vertical, central, longitudinal section of an apparatus embodying my invention.

A shows the delivery end of the glass supply tank, in which B is the drawing chamber, the bottom of which is preferably formed by the slab, C, in the chamber D, which is kept heated by suitable burners, D'. E is a shear cake at the outer end of the drawing chamber and beyond the jack-arch, F, which may be raised and lowered to assist in controlling the temperature in the drawing chamber. G represents a burner for discharging flame into the drawing chamber, for also assisting in controlling this temperature. H is a housing for the drawing mechanism, and I represents a diagrammatic illustration of suitable drawing mechanism—which may be of the construction shown in the Colburn Patent 1,248,809, and which detail I do not deem it necessary to illustrate or describe—as the same is well-known. J is a hollow drive bending roll which may be cooled by air, water or steam, or a combination thereof, to maintain it at the desired temperature; which roll may be of the general construction and operation of the bending roll of the aforesaid Colburn patent.

I preferably provide beneath the horizontal run of the sheet beyond the bending roll a supporting roll, K, which may, however, be omitted if necessary.

I have also shown above the sheet, beyond the bending roll J, suitable burners, L, which may be used if necessary to re-heat the sheet to flattening condition.

In the Colburn patent aforesaid, at each edge of the sheet are employed pairs of edge rolls which are driven and which are provided with suitable cooling means—such as water circulation, for maintaining the width of the sheet and cooling the sheet edges to prevent the narrowing thereof. With a vertical drawing apparatus, these rolls are usually positively driven, to assist in feeding the colder glass at the edges from the tank into sheet form; but in drawing the glass downward, or outward and downward, the advantage of driving these rolls under some conditions does not exist.

Figure 2:
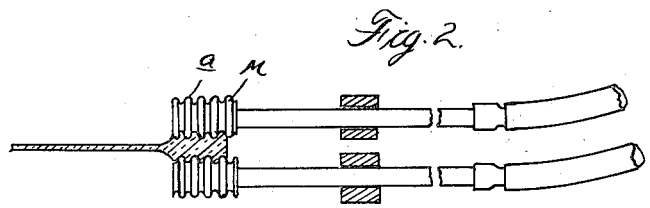
Figure 2 is an enlarged elevation of the width-maintaining rolls.

I therefore provide at the edges, in place of these driven rollers, the rollers M of the construction, for instance, as shown in Figure 2, having circular flanges, $a$, separated by grooves to make, in effect, a corrugated surface; which rollers are idler rollers, being rotated only by the friction of the sheet passing therethrough,—while the sheet is prevented from drawing inward by the interlocking of the glass with the grooves of these rollers. Suitable water connections are provided to cool the rollers, so that, in effect, longitudinal cooled ribs are produced on the edges of the sheet by the rollers, which assist in maintaining it to width.

Figure 3:
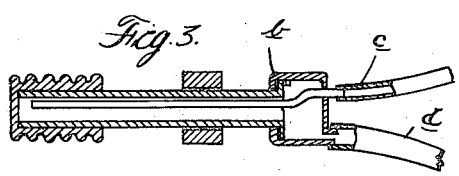
Figure 3 is a longitudinal section through one set of rolls.

In Figure 3 I have shown a swivel joint, $b$, and the water supply connection, at $c$, the outlet for the water being through $d$.

Figure 4:
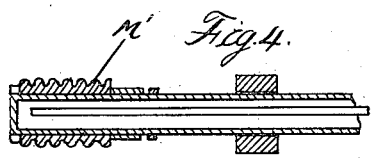
Figure 4 is a similar section through a modified form of such rolls.

Instead of turning the pipe upon which the roller is secured, the pipe may be stationary, as shown in Figure 4, and the roller M' may rotate freely on the end of the pipe.

Figure 5:
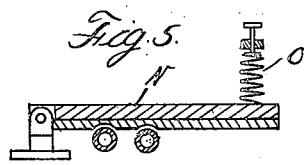
Figure 5 is a section illustrating a means of putting a slight frictional drag upon these rolls.

As, under some conditions, it is desirable to have the rollers driven at a slower speed than the edges of the sheet, this may be accomplished by putting a slight frictional resistance upon the rollers or their shafts,—such, for instance, as shown in Figure 5, where I have illustrated a lever, N, which bears upon the roller shafts, and an adjustable spring O, so that slight friction can be put upon these shafts to slightly retard their rotation.

If the conditions are not satisfactory for using the idler rollers with the drawing and heating mechanism shown herein, the driven rollers of the Colburn patent aforesaid may be employed.

P represents the glass sheet, which is drawn from the edge of the drawing chamber B and the outer end of the slab, C, which I have lettered Q and which I call the drawing lip. From thence the sheet passes downward beneath the roller J, the under surface of which it contacts and which is arranged in line with the drawing mechanism I. It will be seen from this that the sheet is thus suspended, substantially, between the drawing-lip and the drawing table, and tension is put upon it as it bends beneath the roller J, contacting that roll and being flattened.

Suitable burners may be employed, such as R, for maintaining the temperature of the chamber in which is located the bending roll, and also suitable burners (not shown) are employed in the chamber with the drawing mechanism; as is customary with such apparatus.

I have shown the roller J as having its lower edge slightly below the level of the glass as it leaves the drawing-lip; this may be varied, more or less, according to conditions or as may seem desirable, but the slight angle indicated gives the smallest possible contact with the bending roll and tends to reduce the marring effect thereof.

What I claim as new is:

1. The method of making sheet glass, consisting in drawing sheet glass downward from a mass, sustaining the plastic sheet from the drawing point, deflecting the sheet while still plastic beneath a smooth flattening surface into a substantially horizontal plane and applying the draft to the horizontal run of the sheet, and then annealing the sheet.

2. The improvement in the art of drawing sheet glass, consisting in suspending the sheet between the drawing point and the drawing mechanism and tensioning or flattening the sheet by deflecting the sheet downward by an intermediate contacting surface over which it is drawn.

3. In a sheet glass drawing mechanism, the combination with a glass supply having a lateral outlet from which the sheet may be drawn, of a bending roll adjacent the tank and below the outlet, and a drawing mechanism for the sheet beyond the bending roll, so that the glass sheet may be supended between the drawing point and the drawing mechanism and will pass beneath and have tension contact with the underface of the roll.

4. In a sheet glass drawing mechanism, a glass supply having an outlet from which a sheet may be drawn downwardly, of a bending roll below the plane of the drawing point and a horizontal drawing mechanism spaced laterally from the bending roll and adapted to draw a continuous sheet from the source.

In testimony whereof I affix my signature.

JAMES WHITTEMORE.